Sept. 5, 1939.  A. M. FRANDSEN  2,171,523
SAFETY GUARD FOR POWER PRESSES
Filed June 24, 1938   3 Sheets-Sheet 1

Witness
V. Siljander

Inventor
Anton M. Frandsen
By Ernest E. Tupes
Atty.

Sept. 5, 1939.   A. M. FRANDSEN   2,171,523
SAFETY GUARD FOR POWER PRESSES
Filed June 24, 1938   3 Sheets-Sheet 2

Witness:
V. Siljander

Inventor
Anton M. Frandsen
By Ernest E. Tripes Atty

Sept. 5, 1939.　　　　A. M. FRANDSEN　　　　2,171,523
SAFETY GUARD FOR POWER PRESSES
Filed June 24, 1938　　　　3 Sheets-Sheet 3
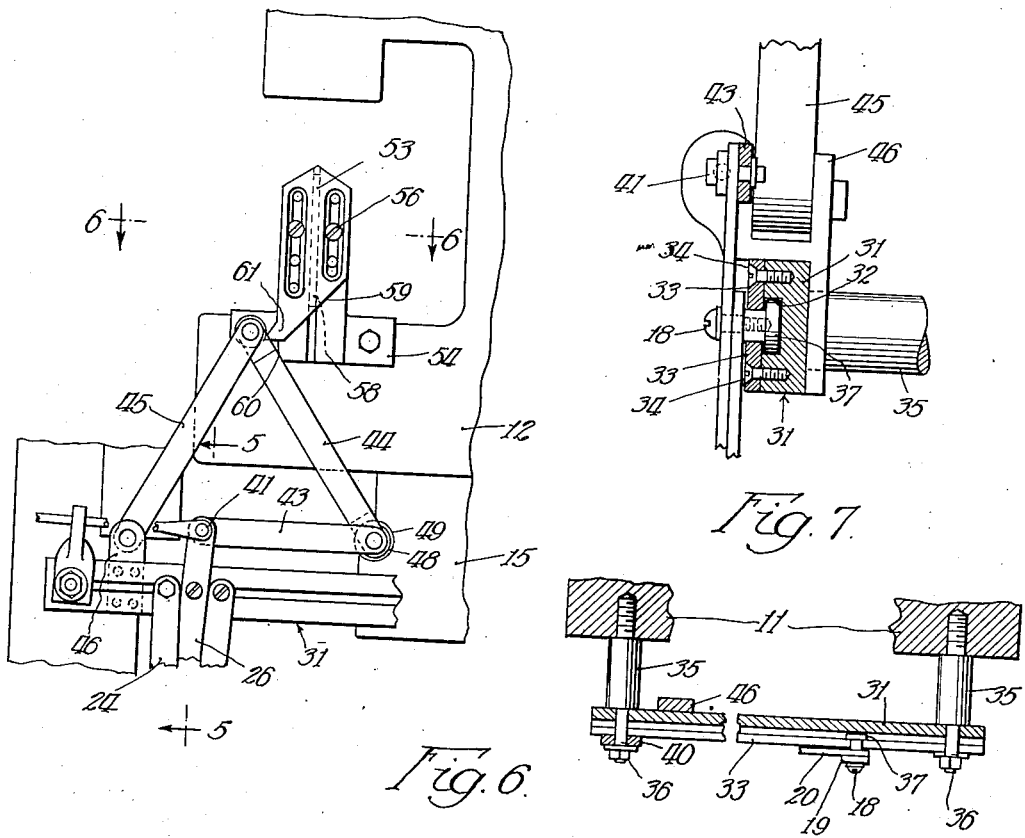
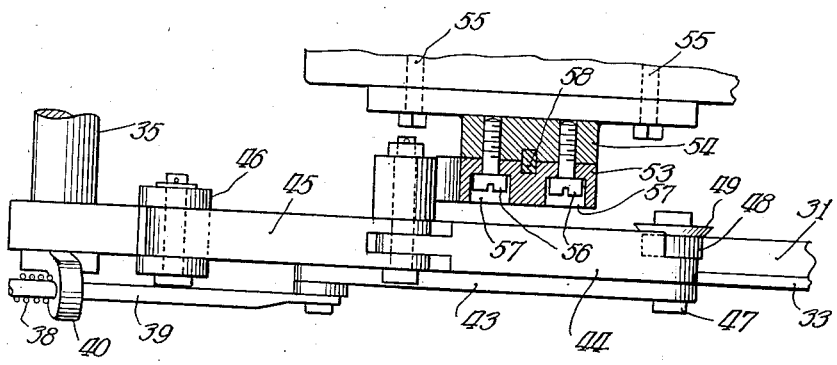
Witness
V. Siljander
Inventor
Anton M. Frandsen
By Ernest E. Tripes
Atty.

Patented Sept. 5, 1939

2,171,523

UNITED STATES PATENT OFFICE 2,171,523

SAFETY GUARD FOR POWER PRESSES

Anton M. Frandsen, Chicago, Ill.

Application June 24, 1938, Serial No. 215,645

10 Claims. (Cl. 74—615)

The invention relates to safety guards for power presses, and other machinery, operable to prevent injury to the operator, and more particularly it relates to devices actuated by the plunger of a power press or by ather suitable reciprocally moving parts of a machine to automatically act to push the operator's hands or arms out of the danger zone as such plunger or moving part is moved toward the work.

One of the objects of the invention is the provision of an improved lazy-tongs safety guard for a press or machine of the kind described and of an improved actuating mechanism therefor intermittently engageable by the plunger of the press and positively actuated thereby to extend the guard and permit its collapse without stopping the press or machine or materially interfering with the operator in working at the press.

The invention is especially adapted for installation on relatively slowly moving power presses which require considerable time to reciprocate the plunger through one cycle of operation, and another object of the invention is the provision of improved guard actuating mechanism so operable as to maintain or to permit the guard to be maintained in retracted position throughout a cycle of operations except for a relatively brief period when the plunger or other reciprocally moving part is approaching and in proximity to the work, the guard being automatically moved to and locked in its protecting position so as to cover the work space only during this brief period and being automatically released to permit its retraction when the plunger or other moving part contacts with the work.

A further object of the invention is the provision of an improved self-operating safety guard of the kind described which increases the potential output of the press by permitting continuous operation and enabling the operator to give his entire time and attention to the material on which the press is operating.

A still further object of the invention is the provision of improved safety guards and actuating mechanism therefor which are durable, simple and inexpensive to manufacture and install, and which are satisfactory for their intended purpose.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings wherein like reference characters indicate like or corresponding parts and wherein the invention is illustrated as installed upon a power press;

Fig. 4 is a fragmentary view of the guard while in collapsed position with the plunger moving upwardly and approaching a position wherein it will disengage the guard actuating mechanism;

Figs. 5 and 6 are respectively views along the lines 5—5 and 6—6 of Fig. 4; and

Figure 1:
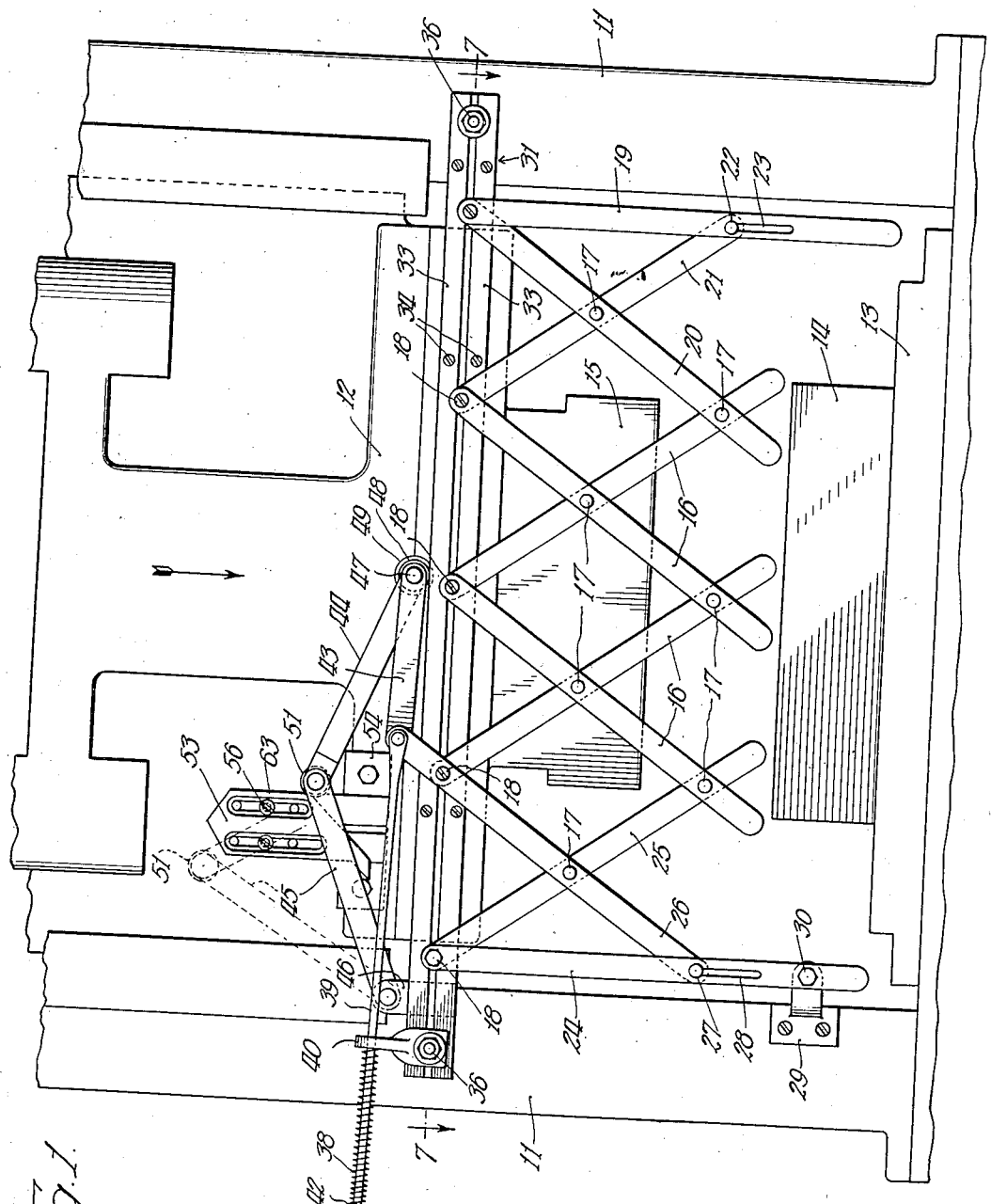
Fig. 1 is a front elevational view showing the guard extended in front of the press with the plunger of the press approaching its work contacting position.

Fig. 7 is a view along the line 7—7 of Fig. 1.

Referring now more particularly to the drawings, the numeral 10 generally designates a lazy-tongs frame and the numeral 11 generally designates a stationary press frame providing guides or runways for an ascending and descending plunger 12 actuated by hydraulic power or other suitable means, not shown. A bed plate 13 provides a support for a stationary die 14 positioned below a die 15 carried by the plunger 12. The front of the press is open above the plate 13 to permit the operator to position work on the stationary die 14 and to maniplate the work for proper engagement by the descending die 15. The guard 10 is mounted on the press frame 11 as hereinafter described and is so positioned that extension of the guard sweeps the hands and arms of the operator aside and momentarily prevents access to the work.

The lazy-tongs frame 10 comprises a plurality of pairs of intersecting bars 16 of substantially equal length arranged to form a collapsible lattice construction. The bars 16 comprising each pair are connected at their intersecting points by pivots 17 and are similarly connected at their lower ends with the adjacent bars. The upper end of each bar 16 is connected with the next adjacent bar by a pivot 18 of special construction providing supports for the guard as hereinafter more particularly described. The movable end of the guard provides a vertical bar 19 projecting downwardly a substantial distance below the lattice construction and connected with the adjacent pair of bars 16 by intersecting bars 20 and 21, the latter being connected at their intersecting point by a pivot 17 to form an extension of the collapsible lattice work. The bar 20 is similar to the bars 16 and is connected with the adjacent bar 16 by a pivot 17 and with the upper end of the vertical bar 19 by a pivot 18. The upper end of the bar 21 is also connected with the adjacent bar 16 by the pivot 18 and is connected at its lower end with the bar 19 by means of a pivot pin or bolt 22 slidable in a slot 23 provided by the bar 19. The described connection of the bar 19 with the lattice work maintains the bar vertical for all positions of collapse or extension of the guard and adapts the bar to sweep aside the arms or hands of an operator by the movement of the guard to extended position.

The other end of the guard comprises a stationary vertical bar 24 connected with the adjacent bars 16 by intersecting bars 25 and 26. The bar 25 is connected at its lower end with the adjacent bar 16 and at its point of intersection with the bar 26 by a pivot 17, and is also connected at its upper end with the bar 24 by means of a pivot 18. The lower end of the bar 26 is connected with the vertical bar 24 by a pin or bolt 27 slidable in a slot 28 provided by the bar 24. The upper end of the bar 26 is connected by a pivot 18 with the adjacent end of the bar 16. The bar 24 is fixedly fastened to and supported by the press frame 11 by means of a bracket 29 suitably mounted on the frame and connected with the bar by a bolt 30.

The guard 10 is supported by a track extending across the press and connected with the opposite sides of the press frame 11. The track comprises a member 31 having a longitudinal recess 32 overlapped by a pair of bars 33 fastened to the member 31 by counter-sunk screws 34. Spacer members 35 having threaded stems on each end provide supports for the track, one threaded end of each member being connected with the press frame 11 and the other threaded end extending through the track member 31 and providing a nut 36 clamped against the track bars 33 and adapted to hold the track member in position.

The pivots 18 at the top of the guard frame 10 are each threadedly connected with cylindrical guide members 37 positioned in the track recess 32. The outer ends of the members 37 are offset as shown so as to be moved freely in the space between the bars 33 as the frame 10 is extended and retracted, the frame being supported by contact of the members with the bottom wall of the recess 32.

Figure 2:
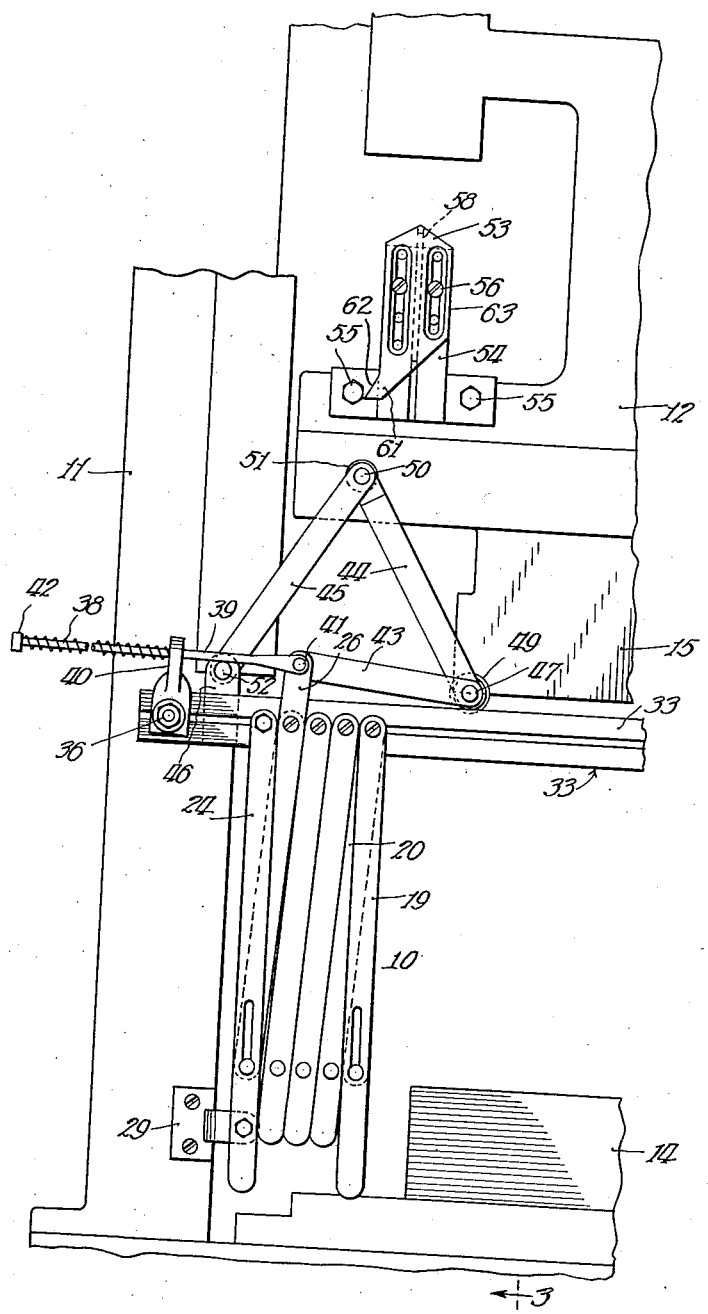
Fig. 2 is a view similar to Fig. 1 with the plunger in elevated position and with the guard in completely collapsed position.
Figure 3:
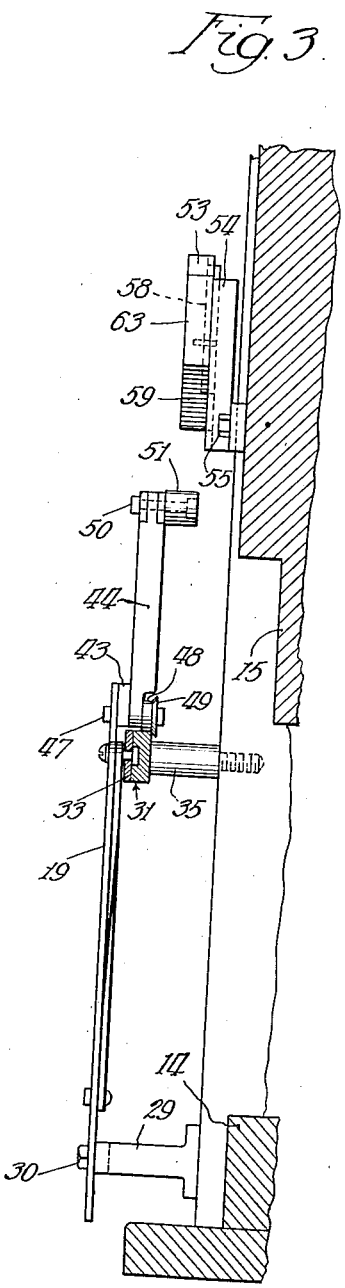
Fig. 3 is a view along the line 3—3 of Fig. 2.

The guard frame 10 is illustrated and hereinafter described as retracted and normally maintained in retracted position by the action of a compression spring 38 carried by a rod 39 slidably mounted in a guide member 40 mounted on the track member and fixedly connected therewith by the adjacent spacer member 35. The guard frame bar 26 projects upwardly as shown to provide a lever operable to extend and to collapse the frame. The end of the rod 39 adjacent to the bar 26 is forked and connected with the bar by a pivot 41. The other end of the rod 39 provides a shoulder member 42 against which one end of the spring 38 abuts, and the opposite end of the spring 38 abuts the fixed guide member 40, the spring being compressed and adapted thereby to maintain the guard frame 10 in the retracted position, as shown in Figs. 2 and 4, and to yield to permit extension of the frame.

Extension of the guard frame 10 to the position shown in Fig. 1 is positively and automatically accomplished by means of a toggle mechanism operatively connected with the upwardly projecting end of the bar 26. The toggle mechanism comprises bars 43, 44, and 45 pivotally connecting the bar 26 with a standard 46 rigidly mounted on the track member 31. One end of the bar 43 is connected with the bar 39 and with the bar 26 by the pivot 41 and the other end of the bar 43 is connected with the bar 44 by means of a pivot 47 carrying a roller 48 adapted to ride on the top of the track member 31, the roller being provided with a tapering flanged edge 49. A pivot 50 carrying a roller 51 provides a toggle connection for the upper ends of the bars 44 and 45, the lower end of the bar 45 being connected to the standard 46 by a pivot 52. The described connection of the toggle bars with the spring controlled rod 39 by means of the pivot 41 results in the bars being normally maintained in the position shown in Figs. 2 and 4. A cam member 53, carried by the press plunger 12, is positioned to engage the roller 51 carried by the toggle mechanism and as the plunger approaches its work engaging position, actuates said mechanism to extend the guard frame 10 and to lock the frame in extended position until the downward stroke of the plunger is completed. The cam member 53 is mounted on a bracket 54 fixedly connected with the plunger 12 by means of bolts 55. The member 53 is fastened to the bracket 54 and adjustable vertically by means of a plurality of screw bolts 56 arranged in two parallel vertical rows having their heads positioned in corresponding recesses 57 provided in the front face of the member. The cam member 53 and the bracket 54 are correspondingly recessed to receive a key 58, the bolts 56 and the key being adapted to hold the member against lateral movement in any adjusted position. The lower end of the member 53 is bounded by a relatively long inclined cam face 59 and a relatively short transversely extending cam face 60 positioned to engage the roller 51 as the plunger moves toward the work. A projection 61 is provided on the lower left hand portion of the cam member 53 as observed in Figs. 1, 2, and 4, the projection being bounded by the cam face 60 and by an inclined cam face 62.

The adjustable mounting of the cam member 53 adapts it to be shifted vertically so that extension of the guard frame 10 will be accomplished at different stages of the downward movement of the plunger 12 in accordance with variations in die thickness and of the work being operated upon. For example, for relatively thin dies 14 and 15 and for relatively thin work, the cam member 53 is elevated and for relatively thick dies and work, the member 53 is correspondingly lowered so that extension of the frame 10 occurs only when the die 15 is in sufficiently close proximity to the work as to endanger the operator with the obvious advantage that the period of extension of the guard frame 10 is reduced to a minimum and starts only when necessary for protection of the operator.

The sequence of operations of the toggle mechanism is such that the cam member 53 cooperates with the roller 51 in a manner to extend the frame as described and then to release the toggle mechanism from engagement with the member and permit retraction of the frame 10 by the spring 38 while the die 15 is in contact with the work or, if the spring is omitted, to permit retraction of the frame manually. Referring to Fig. 2 wherein the plunger 12 and the die 15 are at their maximum elevation, the downward stroke of the plunger moves the cam member 53 to bring the cam face 60 into initial contact with the roller 51. As the plunger continues its descent, the toggle bar 44 is moved to the right and the roller 51 rides off the cam face 60 and onto the inclined cam face 59. Continued descent of the plunger moves the toggle bars 44 and 45 to the position shown in Fig. 1 corresponding to the fully extended position of the guard frame 10. Further downward movement of the plunger causes the roller 51 to move to a position wherein it is engaged by the adjacent vertical face 63 of the cam member 53 and the frame 10 is thereby locked in fully extended position and remains so locked while the plunger is traveling through the remainder of its downward stroke. Continued downward movement of the cam member 53 with the plunger 12 results in the roller 51 disengaging the vertical cam face 63 on the instant or just prior to the plunger 12 reaching the end of its downward movement. The toggle mechanism being thereby released from operative engagement with the cam member 53, the frame 10 is automatically retracted to collapsed position by the action of the spring 38, the roller 51 being thereby swung above the cam member to its normal position relative to the collapsed fame, shown in dotted lines in Fig. 1, and in this position the roller is in vertical alignment with and above the cam projection 61. Upward movement of the plunger 12 causes the cam member 53 to move alongside and to engage the roller 51 with the inclined cam face 62 whereby the roller rides over said face to the position shown in Fig. 4, and tilts the toggle mechanism about the pivot 52. Continued elevation of the plunger 12 disengages the cam projection 61 and the roller 51 whereupon the toggle mechanism drops back to normal position wherein the roller 48 rests on the track member 31, and the roller 51 is positioned below, and will be operatively engaged by the cam face 60 as the plunger again descends. The tapered flange 49 of the roller 48 serves as a guide to properly position the roller on the track member 31 and to align the toggle mechanism with the member as it moves by gravity from its elevated position following disengagement of the roller 51 and the cam projection 61.

The suspension of the latticed guard frame 10 from the track, by the guide members 37 as described, enables the frame to be easily extended and collapsed since there is no binding of the lattice bars at their pivoted connections as is the case with a frame supported as a cantilever. The frame 10 can be made of any desired length by varying the movement of the bars 16 to suit the particular installation and in any given installation, the width of the cam member 53 and the length and inclination of the toggle bars 44 and 45 will depend upon the required extension, it being understood that the width of the cam members and the sweep of the toggle mechanism will be greater for relatively long frames than for those that are relatively short. The adjustment vertically of the position of the cam member 53 on the plunger 12 also adapts any particular frame for use with presses utilizing a variety of dies 14 and 15 of different depths.

Thus, it will be seen that I have provided an improved safety guard and actuating means therefor for use with power presses and the like having a reciprocating plunger or work forming part, the guard being suitable for installation on presses or machines of a great variety of sizes and shapes and which is automatically extended by the reciprocating member as it approaches the work and the frame being released for retraction either manually or by a resilient member, upon the instant that the plunger contacts with the work, whereby the frame is in extended position only when the operation of the press or machine is hazardous to the operator.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A guard for a power press comprising an extensible and collapsible frame, mechanism movable to extend and collapse the frame, a resilient member tending to maintain the mechanism in the collapsed position of the frame, and a cam member carried by the plunger of the press so positioned as to operatively engage and actuate said mechanism to extend the frame and lock the frame in extended position as the plunger approaches its work engaging position, said cam member being released from operative engagement with said mechanism upon final movement of the plunger to its work engaging position to permit said resilient member to actuate said mechanism to collapse the frame.

2. A guard for a power press comprising an extensible and collapsible frame, a cam member carried by the plunger of the press, and mechanism operable to extend the frame, said frame being normally collapsed and said mechanism being normally positioned in the path of the cam member when the frame is collapsed, said cam member being positioned to operatively engage and actuate said mechanism in a direction to extend and to maintain the frame in extended position as the plunger approaches its work engaging position, said cam member being moved to operatively disengage said mechanism upon movement of the plunger to its work engaging position.

3. A guard for a power press comprising an extensible and collapsible frame, mechanism operable to extend and collapse the frame, a resilient member tending to maintain the mechanism in the collapsed position of the frame, and a cam member carried by the plunger of the press, said frame being normally collapsed and said mechanism being normally positioned in the path of the cam member when the frame is collapsed, said cam member being positioned to operatively engage and actuate said mechanism in a direction to extend and to maintain the frame in extended position as the plunger approaches its work engaging position, said cam member being released from operative engagement with said mechanism upon movement of the plunger to its work engaging position and thereby permitting said resilient member to collapse the frame and return the mechanism to its normal position.

4. A guard for a power press comprising an extensible and collapsible frame, a cam member carried by the plunger of the press, toggle mechanism operable to extend the frame, said frame being normally collapsed and said mechanism being normally positioned in the path of the cam member when the frame is collapsed, said cam member being so positioned that it operatively engages and actuates said toggle mechanism in a direction to extend and to maintain the frame in extended position only as the plunger approaches its final work engaging position, said cam member being moved to operatively disengage said mechanism upon movement of the plunger to its full work engaging position, and means operable to collapse the extended frame and to return the mechanism to said normal position upon said disengagement of the cam member, movement of the plunger away from its work engaging position being adapted to carry the cam member past said mechanism and in passing to thrust the mechanism out of its path in a direction such that the frame is not extended thereby.

5. A guard for a power press comprising an extensible and collapsible frame, a cam member carried by the plunger of the press, toggle mechanism operable to extend the frame, said frame being normally collapsed and said mechanism being normally positioned in the path of the cam member when the frame is collapsed, said cam member being so positioned that it operatively engages and actuates said mechanism to extend and to maintain the frame in extended position during final movement of the plunger to its work engaging position, said cam member operatively disengaging said mechanism upon the plunger reaching its full work engaging position, means operable to collapse the extended frame and to return the mechanism to said normal position upon its said disengagement with the cam member, said mechanism being tiltable from its normal position without actuating the frame, movement of the plunger away from its work engaging position being adapted to carry the cam member past said mechanism and in passing to tilt the mechanism out of its path in a direction such that the frame is not extended thereby, said mechanism being returned by gravity to its said normal position upon its disengagement with said upwardly moving cam member.

6. A guard for a power press comprising an extensible and collapsible frame, a cam member carried by the plunger of the press, toggle mechanism positioned in the path of the cam member and operable thereby to extend the frame, said mechanism being normally positioned in the path of the cam member when the frame is collapsed, said cam member being so positioned that it operatively engages and actuates said mechanism to extend and to maintain the frame in extended position only when the plunger is closely approaching its work engaging position, said cam member being moved to disengage said mechanism when the plunger has reached its work engaging position, means operable to collapse the extended frame and to return the mechanism to said normal position upon its disengagement with the cam member, and a pivot about which said mechanism is tiltably movable from said normal position, movement of the plunger away from its work engaging position being adapted to carry the cam member past said mechanism and in passing to tilt the mechanism out of its path, said mechanism being returned by gravity to its normal position when the cam member has moved beyond the mechanism.

7. The combination with a power press or the like providing a stationary frame and a plunger movable vertically in said frame, of a cam member mounted on and projecting from one face of the plunger, said cam member having two opposite lateral edges respectively bounded by vertical faces, a cam projection at the lower edge of one of said vertical faces, said projection being bounded by a horizontal bottom face and an inclined face connecting said bottom face with the contiguous vertical face, said cam member being bounded by an inclined bottom face connecting said horizontal bottom face with the vertical face opposite said projection, a lazy tongs frame extending alongside the path of said cam member with one end fastened to the stationary frame on the side contiguous to said cam projection, an inverted V-shaped toggle mechanism comprising two links having their lower ends respectively pivotally connected with the stationary frame and the lazy tongs frame, a pivot connecting the upper ends of said links, a roller mounted on said pivot so positioned that it lies in the path of said cam projection when the lazy tongs frame is retracted, said roller being below the cam member when the plunger is at the beginning of its downward stroke and being above said cam member when the plunger is at the end of its downward stroke, said roller being initially engaged by the horizontal face of the cam projection as the plunger approaches the end of its descent, the roller being moved thereby in turn over said horizontal and inclined bottom faces to extend the lazy tongs frame, and while completing its descent the cam member moves with its contiguous vertical face in contact with the roller to temporarily lock the lazy tongs frame in extended position, said cam member being disengaged from the roller upon completion of its descent to permit retraction of the lazy tongs frame, and means operable to retract said frame and mechanism accompanied by movement of the roller above the cam member to a position above said cam projection.

8. The combination with a power press or the like providing a stationary frame and a plunger movable vertically in said frame, of a cam member mounted on and projecting from one face of the plunger, said cam member having two opposite lateral edges respectively bounded by vertical faces, a cam projection at the lower edge of one of said vertical faces bounded by a horizontal bottom face and an inclined face connecting said bottom face with the contiguous vertical face, said cam member being bounded by an inclined bottom face connecting said horizontal bottom face with the vertical face bounding the lateral edge opposite said projection, a lazy tongs frame extendig alongside the path of said cam member having one end fastened to the stationary frame on the side contiguous to said cam projection, an inverted V-shaped toggle mechanism comprising two links having their lower ends respectively pivotally connected with the stationary frame and the lazy tongs frame, a pivot connecting the upper ends of said links, a roller mounted on one end of said pivot and in the path of said cam projection when the lazy tongs frame is retracted, said roller being below the cam member when the plunger is at the beginning of its downward stroke and being above said cam member when the plunger is at the end of its downward stroke, said cam member being so positioned that the roller is initially engaged by the horizontal face of the cam projection as the plunger approaches the end of its descent and the roller is moved thereby in turn over said horizontal and inclined bottom faces to extend the lazy tongs frame and while completing its descent the cam member moves with its contiguous vertical face in contact with the roller to temporarily lock the lazy tongs frame in extended position, said cam member being disengaged from the roller upon completion of its descent to permit retraction of the lazy tongs frame, means operable to retract the lazy tongs frame and mechanism accompanied by movement of the roller above the cam member to overlie the cam projection, and means for permitting adjustment of the position of the cam member on the plunger.

9. The combination with a power press or the like providing a stationary frame and a plunger movable vertically in said frame, of a cam member mounted on and projecting from one face of the plunger, said cam member having two opposite lateral edges respectively bounded by vertical faces, a cam projection at the lower edge of one of said vertical faces bounded by a horizontal bottom face and an inclined face connecting said bottom face with the contiguous vertical face, said cam member being bounded by an inclined bottom face connecting said horizontal bottom face with the vertical face bounding the lateral edge opposite said projection, a lazy tongs frame extending alongside the path of said cam member having one end fastened to the stationary frame on the side contiguous to said cam projection, a track member providing a support for the lazy tongs frame in all positions of extension and retraction, an inverted V-shaped toggle mechanism comprising two links, one having its lower end pivotally connected with the stationary frame and the other having its lower end swingably connected with the lazy tongs frame, a pivot connecting the upper ends of said links, a roller mounted on a projecting end of said pivot, and in vertical alignment with said cam projection when the lazy tongs frame is retracted, said roller being below the cam member when the plunger is at the beginning of its downward stroke and being above said cam member when the plunger is at the end of its downward stroke whereby the roller is initially engaged by the horizontal face of the cam projection as the plunger approaches the end of its descent and the roller is moved thereby in turn over said horizontal and inclined bottom faces to extend the lazy tongs frame and while completing its descent the cam member moves with its contiguous vertical face in contact with the roller to temporarily lock the lazy tongs frame in extended position, said cam member being disengaged from the roller upon completion of its descent to permit retraction of the lazy tongs frame and toggle mechanism accompanied by movement of the roller above the cam member into vertical alignment with the cam projection whereby said projection engages the roller as it ascends and tilts the mechanism to permit movement of the cam member back to its elevated position, and means operable to retract the lazy tongs frame.

10. The combination with a power press or the like providing a stationary frame and a plunger movable vertically in said frame, of a cam member mounted on and projecting from one face of the plunger, said cam member having two opposite lateral edges respectively bounded by vertical faces, a cam projection at the lower edge of one of said vertical faces bounded by a horizontal bottom face and an inclined face connecting said bottom face with the contiguous vertical face, said cam member being bounded by an inclined bottom face connecting said horizontal bottom face with the vertical face bounding the lateral edge opposite said projection, a lazy tongs frame extending alongside the path of said cam member having one end fastened to the stationary frame on the side contiguous to said cam projection, a track member providing a support for the lazy tongs frame in all positions of extension and retraction, an inverted V-shaped toggle mechanism comprising two links one having its lower end pivotally connected with the stationary frame and the other having its lower end swingably connected with the lazy tongs frame, a pivot connecting the upper ends of said links, a roller mounted on a projecting end of said pivot, and in vertical alignment with said cam projection when the lazy tongs frame is retracted, said roller being below the cam member when the plunger is at the beginning of its downward stroke and being above said cam member when the plunger is at the end of its downward stroke whereby the roller is initially engaged by the horizontal face of the cam projection as the plunger approaches the end of its descent and the roller is moved thereby in turn over said horizontal and inclined bottom faces to extend the lazy tongs frame and while completing its descent the cam member moves with its contiguous vertical face in contact with the roller to temporarily lock the lazy tongs frame in extended position, said cam member being disengaged from the roller upon completion of its descent to permit retraction of the lazy tongs frame and toggle mechanism accompanied by movement of the roller above the cam member into vertical alignment with the cam projection whereby said projection engages the roller as it ascends and tilts the mechanism to permit movement of the cam member back to its elevated position, means operable to retract the lazy tongs frame, and means for permitting adjustment of the position of said cam member on said plunger to vary the point at which the cam member engages and disengages the roller.

ANTON M. FRANDSEN.